United States Patent
Rick et al.

(10) Patent No.: US 6,370,672 B1
(45) Date of Patent: Apr. 9, 2002

(54) DETERMINING THE RECEIVED DATA RATE IN A VARIABLE RATE COMMUNICATIONS SYSTEM

(75) Inventors: Roland R. Rick, San Diego; Mark Davis, Carlsbad; Paul Wei, San Diego; Feng Qian, San Diego; Brian Banister, San Diego, all of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/430,994

(22) Filed: Nov. 1, 1999

(51) Int. Cl.[7] .................. H03M 13/03; H04B 17/00
(52) U.S. Cl. .................. 714/795; 375/225; 708/530
(58) Field of Search ...................... 714/795, 796, 714/786, 758, 704, 708; 708/420, 421, 530; 375/224, 225, 262

(56) References Cited

U.S. PATENT DOCUMENTS 5,402,244 A * 3/1995 Kim ..................... 358/261.2
5,410,671 A * 4/1995 Elgamal et al. ............. 711/202
6,108,372 A * 8/2000 Tidemann, Jr. et al. ..... 375/225
6,327,314 B1 * 12/2001 Cimini, Jr. et al. ......... 375/340

* cited by examiner

Primary Examiner—Christine T. Tu

(57) ABSTRACT

The present invention comprises methods and apparatus for determining the rate at which data was encoded when such data is received at a receiver. According to the present invention, the rate is determined by computing, for a plurality of possible rates, a final test statistic based on a plurality of measures. The final test statistics are compared and based upon certain selection criteria (for example, without limiting the foregoing, which final test statistic corresponds the highest value), the rate is selected. In the preferred embodiment, the measures comprise statistics based on the cyclical redundancy check, Viterbi metrics, re-encoded symbol error rate, and distance to next largest Viterbi metric.

6 Claims, 3 Drawing Sheets

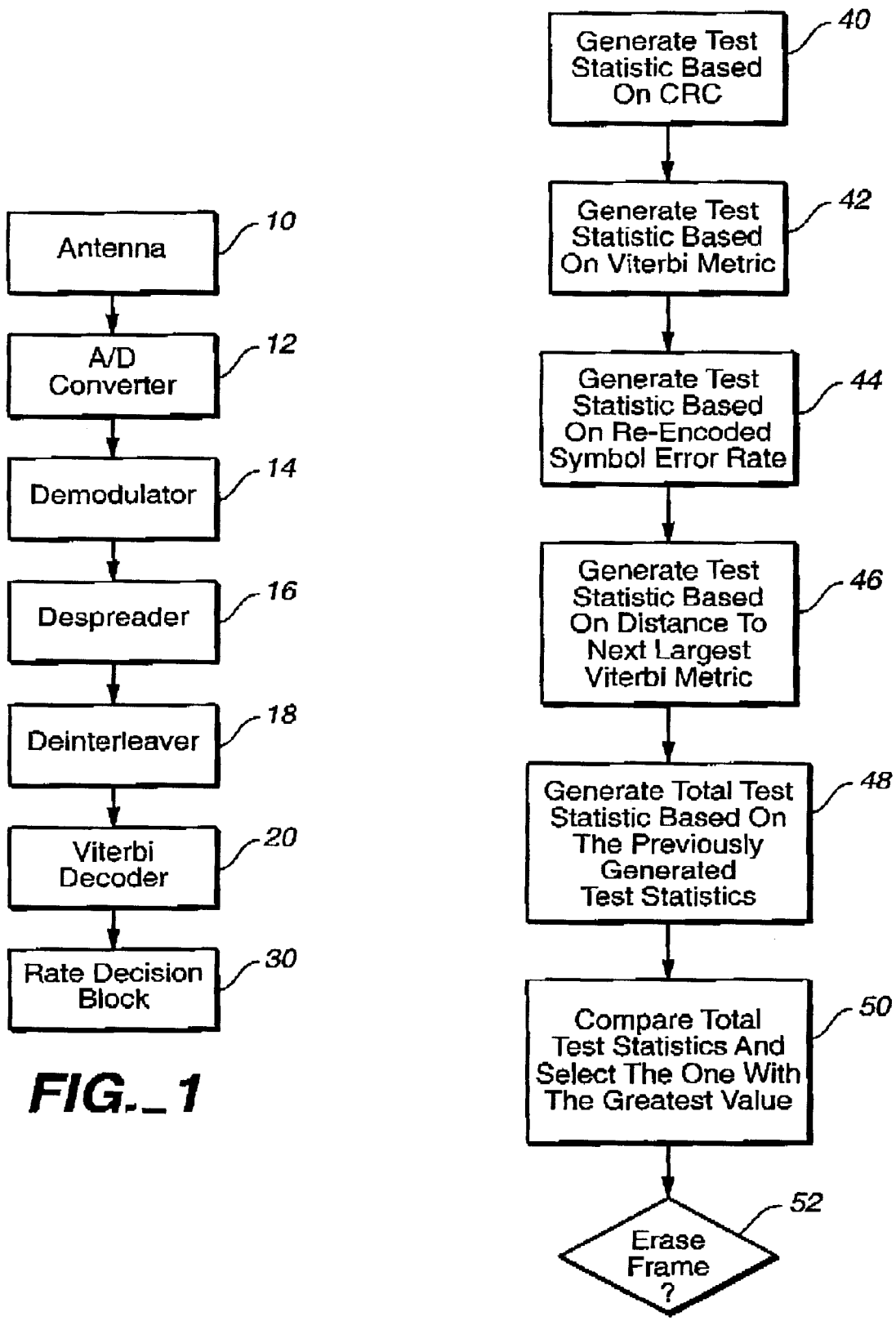

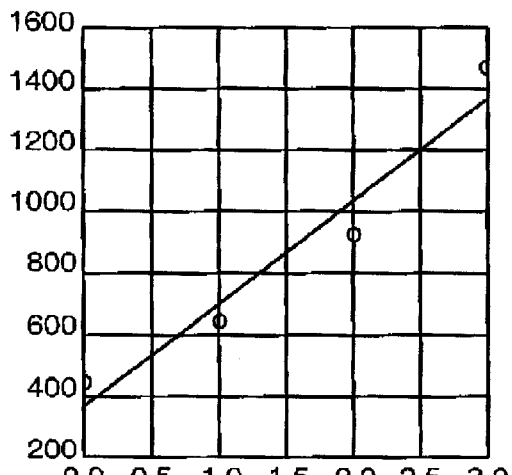
FIG._3a
Average Viterbi Metrics for Full Rate Transmit in AWGN
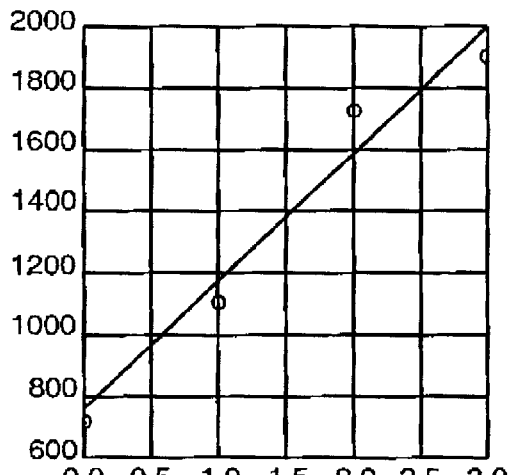
FIG._3b
Average Viterbi Metrics for Half Rate Transmit In AWGN
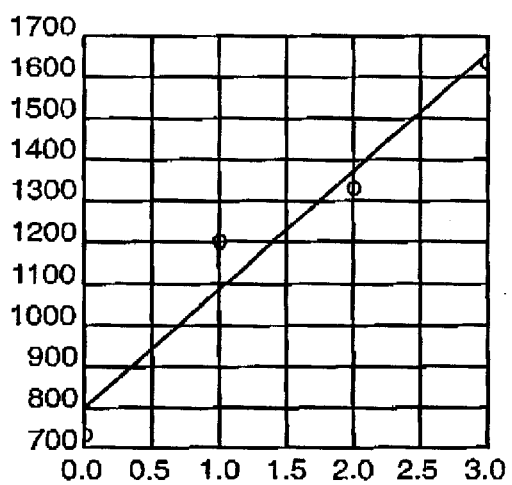
FIG._3c
Average Viterbi Metrics for Quarter Rate Transmit In AWGN
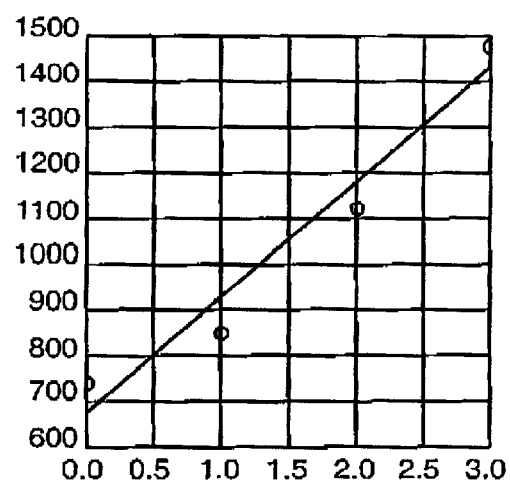
FIG._3d
Average Viterbi Metrics for Eighth Rate Transmit In AWGN

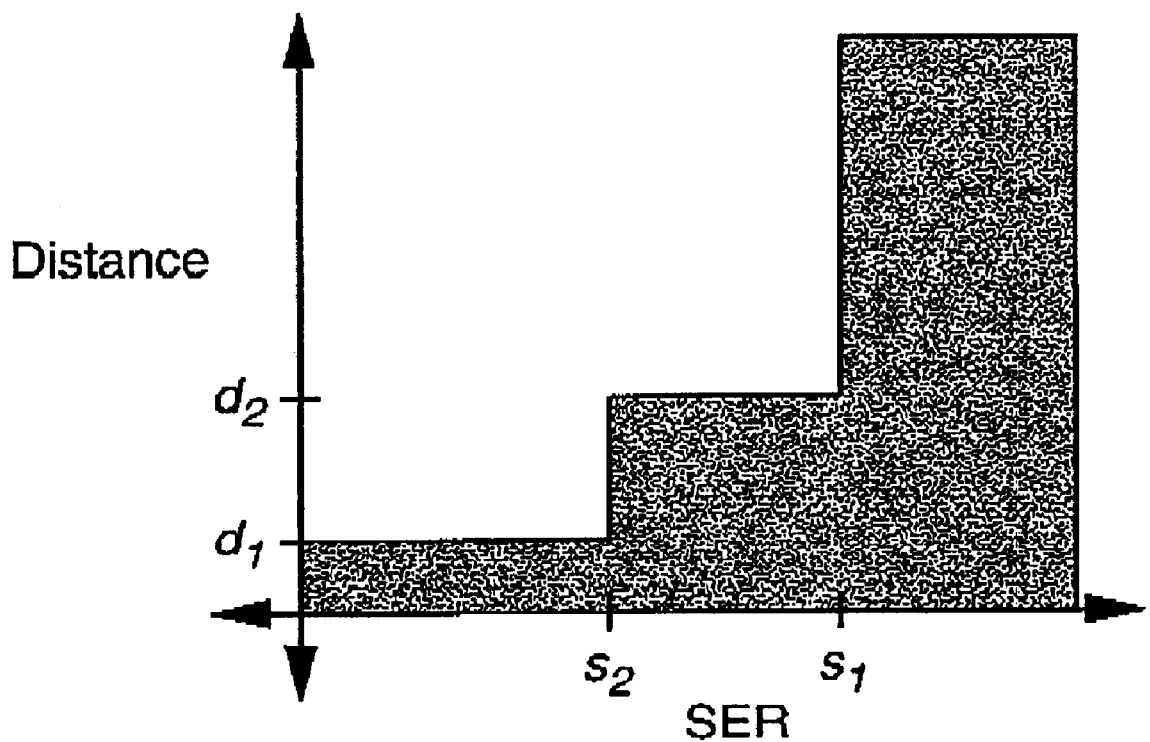
FIG._4

DETERMINING THE RECEIVED DATA RATE IN A VARIABLE RATE COMMUNICATIONS SYSTEM

BACKGROUND OF THE INVENTION

1. Field of the Invention

This invention relates to receivers and more specifically to methods and apparatus for determining data rates of signals received by a receiver.

2. Description of the Related Art

One of the primary uses of cellular communications system is for the transmission of voice. Voice is sampled and then compressed into a digital data stream for transmission and then transmitted to/from a base station and a mobile user. One of the key features of common voice compression algorithms is that it takes more bits to represent speech when someone is talking as compared to when someone is not talking (listening to the other person speaking). There are also different sounds in speech, which go require varying amounts of bits to represent. Therefore, the data rate that should preferably be transmitted to/from a base station and a mobile user is variable. Furthermore, the data rate depends on the person speaking at the transmitter and the receiver has no way of predicting what the data rate will be at any given point in time. Therefore, the receiver must have a method of determining what the received data rate is based on the received data.

Some conventional methods of determining what the received data rate is based on the received data involve the determination of whether various measures exceed a certain threshold. Such measures include the outcome of a cyclical redundancy check (CRC) and the values of Viterbi metrics, Yamamoto Quality Metrics, and Symbol Error Rates. For example, in a system with 4 possible rates, the CRC may be checked for the two highest rates, and if the CRC passes for these two rates, the system determines that one of these two rates is the received rate. To select between these two rates, one or more of the other measures may be compared against thresholds and the rate is selected based upon the outcome of this comparison.

It would be desirable to improve upon the accuracy of such conventional methods.

SUMMARY OF THE INVENTION

The present invention comprises methods and apparatus for determining the rate at which data was encoded when such data is received at a receiver. According to the present invention, the rate is determined by computing, for a plurality of possible rates, a final test statistic based on a plurality of measures. The final test statistics are compared and based upon certain selection criteria (for example, without limiting the foregoing, which final test statistic corresponds the highest value), the rate is selected. In the preferred embodiment, the measures comprise statistics based on the cyclical redundancy check, Viterbi metrics, re-encoded symbol error rate, and distance to next largest Viterbi metric.

BRIEF DESCRIPTION OF THE DRAWINGS

Other objects and advantages of the invention will become apparent upon reading the following detailed description and upon reference to the accompanying drawings in which:

FIG. 1 is a block diagram of a receiver that is part of CDMA communications system.

FIG. 2 is a flow chart that describes the preferred operation of a rate decision block according to the present invention.

FIGS. 3a–3d are graphs that show 4 Viterbi metrics and a line which minimizes the sum of the mean squared error at each point.

FIG. 4 is a graph that shows distance versus symbol error rate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

This specification describes a method and apparatus pertaining to a CDMA receiver. However, it will be appreciated that the present invention is not restricted to CDMA systems. It will further be appreciated that the present invention is not restricted to voice data but is applicable to any type of data that is encoded at a variable rate. Although this disclosure sets forth certain assumptions and specific values for various parameters, it will be appreciated that the present invention is not restricted to these assumptions or specific values.

General System Description

FIG. 1 is a block diagram of a receiver that is part of CDMA communications system. An antenna 10 receives a signal that was transmitted by a transmitter (not shown) and provides it to an A/D converter 12, which digitizes the signal. The digitized signal is provided to a demodulator 14, which demodulates the digitized signal and provides a demodulated signal to a despreader 16, which multiplies the demodulated signal by a desired despreading code and averages over a symbol interval to create a despread signal. The despread signal is then provided to a deinterleaver 18.

Deinterleaver 18 deinterleaves a frame of data and provides it to a Viterbi decoder 20, which decodes the signal which is provided to the Viterbi decoder 20 in the form of soft decision data. More particularly, the Viterbi decoder 20 decodes the signal for a number of different rates (4 in the preferred embodiment). (Alternatively, a number of different Viterbi decoders could output metrics for corresponding data rates). As part of the decoding process, the Viterbi decoder 20 computes a highest metric for each rate where the (Viterbi) metric is a statistic related to the likelihood that a particular sequence was the actual sequence transmitted. The Viterbi decoder 20 also computes the distance to the next largest Viterbi metric.

A rate decision block 30 receives information and estimates the most likely rate and provides this rate to a rate decoder, which receives the decoded sequence from the Viterbi decoder 20 and further decodes this sequence based upon the most likely rate.

FIG. 2 is a flow chart that describes the preferred operation of the rate decision block 30. In blocks 40, 42, 44, 46, respectively, a test statistic for each rate is computed based upon the CRC's, the Viterbi metrics, the Re-Encoded Symbol Error Rate and distance to the next largest Viterbi metric, respectively. These test statistics will be described more fully below. In block 48, the test statistics for each are combined to arrive at a total test statistic for each rate. In block 50, the total test statistics are compared and the rate corresponding to the test statistic with the greatest value is selected. After the rate is selected, the frame may be erased as shown in block 52, as will be further described below.

Total Test Statistic—Block 48

According to the present invention, the preferred method for determining the received rate is to calculate the probability of each rate given a set of statistics and choose the largest probability. This is commonly know as maximizing the a posterior probability density function. Denoting the probability density of "a" given "b" as p(a|b), the probability of each rate given a set of statistics can be written as $$p(r_i | \overline{Y}) = \frac{p(\overline{Y} | r_i) p(r_i)}{p(\overline{Y})}$$

where $r_i$ represents the $i^{th}$ rate and $\overline{Y}$ represents the set of statistics being used for rate decision. The object is to find the rate which maximizes the above equation. The denominator is independent of the rate, so it does not affect the maximization. If there is no apriori information about the received rate, then $p(r_i)$ is a constant and does not affect the maximization either. This is true if the assumption is made that the rate for each frame is an independent random variable. The preferred embodiment is based upon this assumption but it will be appreciated that the present invention may be practiced without making this assumption. Under this assumption, the preferred algorithm reduces to finding the rate which maximizes $p(\overline{Y}|r_i)$, which is also known as the a priori density function. If the set of statistics $\overline{Y}$ consists of N independent statistics, the a priori density function can be expressed as $$p(\overline{Y}|r_i) = p(\overline{Y}_1|r_i) \ldots p(\overline{Y}_N|r_i)$$

Finally, since the natural logarithm is a monotonic function, the optimal rate decision algorithm can be expressed as finding the rate which maximizes the following equation:

$$\ln p(\overline{Y}|r_i) = \ln p(\overline{Y}_1|r_i) + \ldots + \ln p(\overline{Y}_N|r_i)$$

which is also known as the log-likelihood function. The probability density functions of each of the statistics (i.e. the Y's) that will be used for rate decision will be discussed below. In the preferred embodiment, these statistics pertain to CRC, Viterbi metric, re-encoded symbol error rate and distance to next largest Viterbi metric.

According to the IS-98 CDMA standard, there are two rate sets, rate set 1 and rate set 2. Preferred test statistics will be derived for each of these rate sets.

CRC

According to the preferred embodiment, the most important statistic about the rate of the received frame is the CRC. For rate set 1, there is a 12 bit and 8 bit CRC placed on the fill and half rate frames, respectively. For rate set 2, there is a 12, 10, 8, and 6 bit CRC placed on the full, half, quarter, and eighth rate frames, respectively. If a particular rate was sent, the CRC verifies that the frame was received correctly. For rate set 2, the most typical scenario is that the CRC passes for only the actual received rate and whichever CRC passes is the most likely received rate. The receiver would operate reasonably well if this were the only statistic used for rate decision. It would not however pass specifications defined in the appropriate standards. For rate set 1, the CRC only helps for full and half rate. A different statistic should preferably be used for determining a lower rate was received.

A preferred statistic for rate set 2 will now be described. Let $c_i$ be a flag which is equal to 1 if the CRC passes for the $i^{th}$ rate and equal to 0 if the CRC fails for the $i^{th}$ rate. Given that the $i^{th}$ rate was transmitted, the probability density function of $c_i$ can be approximated by, $$p(c_i | r_i) = \begin{cases} 1 & c_i = 1 \\ F & c_i = 0 \end{cases}$$

where F is the frame error rate which is a random variable, but can be approximated by a constant without significant loss in performance. For the CRCs, any probability which is close to 1 will be approximated by 1 without affecting rate decision significantly. Given that a different rate was transmitted, the probability density function of $c_i$ can be approximated by, $$p(c_i | r_j, i \neq j) = \begin{cases} \frac{1}{2^{l_i}} & c_i = 1 \\ 1 & c_i = 0 \end{cases}$$

where $l_i$ represents the number of bits used for the CRC for the $i^{th}$ rate. Given any specific transmit rate $r_i$, the density function of each of the CRCs is independent. Using this and denoting the overall CRC statistic as $\overline{Y}_1$, the probability density function of $\overline{Y}_1$ can be expressed as $$p(\overline{Y}_1|r_i) = p(c_0|r_i) p(c_1|r_i) p(c_2|r_i) p(c_3|r_i)$$

where the subscript 0,1,2, and 3 represent eighth, quarter, half, and full rates, respectively. The natural log of the probability density function can be represented as $$\ln p(\overline{Y}_1|r_i) = \ln p(c_0|r_i) + \ln p(c_1|r_i) + \ln p(c_2|r_i) + \ln p(c_3|r_i)$$

where the natural log of the individual density functions is given by $$\ln p(c_i | r_i) = \begin{cases} 0 & c_i = 1 \\ \ln F & c_i = 0 \end{cases}$$

and $$\ln p(c_i | r_j, i \neq j) = \begin{cases} -l_i \ln 2 & c_i = 1 \\ 0 & c_i = 0 \end{cases}$$

The results above are given for rate set 2. For rate set 1, the results are the same except the terms for $c_3$ and $c_4$ are omitted.

Viterbi Metrics

The function of the Viterbi decoder is to compare the received symbol estimates with every possible received sequence and output the most likely received sequence. It does this by effectively multiplying the received symbol estimates by all possible received sequences of +/−1, summing the entire sequence, and choosing the largest sum. The value of the largest sum is a measure of how likely the received sequence corresponds to the rate being decoded.

After decoding the received sequence for each possible received rate, the Viterbi decoder outputs the largest sum for each rate. These sums are called the Viterbi metrics. They provide enough additional information to the CRCs to significantly improve the probability of making an incorrect rate decision.

Since the Viterbi metrics are the sums of a large number of random variables, the density function of the metrics can be assumed to be Gaussian. However, the means and variances of the metrics change with the channel and it is difficult to find a useful method which uses this assumption. There are currently 2 main approaches for using the Viterbi metric. The first is to treat the problem as maximizing the probability of the transmit sequence given the received sequence assuming all possible transmit sequences of all possible rates. Since the number of sequences for each rate is unequal, this algorithm reduces to weighting the 4 Viterbi metrics for each rate with a function of the SNR and the number of sequences for that rate, and choosing the largest. This is perhaps the best approach if an accurate estimate of the SNR could be derived.

The current preferred approach comes from plotting the 4 Viterbi metrics versus x, x=0,1,2,3. The pattern that emerges is that the Viterbi metric for the actual rate is typically higher than the best fit line of all the metrics. This is depicted in FIGS. 3a–3d. For each frame, the 4 metrics are used to derive a line which minimizes the sum of the mean squared error at each point. The metric for each rate is then a function of the distance from the metric to the line at each point.

To find the line which minimizes the mean squared error, let v(x) represent the viterbi metrics for ⅛, ¼, ½, and full rate for x=0,1,2, and 3, respectively. Defining the best fit line as $y(x)=y_1x+y_2$, the goal is to find the values of $y_1$ and $Y_2$ which minimize $$\sum_{x=0}^{3} [y(x) - v(x)]^2$$

Taking the partial derivative with respect to $y_1$ and $Y_2$, and setting them equal to zero, the best fit line becomes the solution to the following equation $$\begin{bmatrix} 14 & 6 \\ 6 & 4 \end{bmatrix} \begin{bmatrix} y_1 \\ y_2 \end{bmatrix} = \begin{bmatrix} \sum_{x=0}^{3} xv(x) \\ \sum_{x=0}^{3} v(x) \end{bmatrix}$$

which can be reduced to $$\begin{bmatrix} y_1 \\ y_2 \end{bmatrix} = \begin{bmatrix} .2 & -.3 \\ -.3 & .7 \end{bmatrix} \begin{bmatrix} \sum_{x=0}^{3} xv(x) \\ \sum_{x=0}^{3} v(x) \end{bmatrix}$$

This solution can be shown to be a global minimum for all values of v(x). The next step is to find a function of [v(x)−y(x)] that can be used in the computation of the test statistic for each rate. This was chosen to take a similar form to the re-encoded SER and distance metrics without much justification, and is given by $$\ln p(\overline{Y}_2 | r_i) = \frac{\text{sgn}[v(i) - y(i)] * [v(i) - y(i)]^2}{2\sigma_v^2}$$

where the subscript 0,1,2, and 3 represent eighth, quarter, half, and full rates, respectively, and the variance parameter should preferably be determined experimentally.

Re-Encoded Symbol Error Rate

After the Viterbi decoder determines the most likely received sequence for each rate, these sequences can be passed through a convolutional encoder and interleaver similar to the one at the transmitter (base station) to produce estimates of the received symbols. These estimates can be compared to the sign of the actual received symbols to determine a symbol error rate. This is defined as the re-encoded symbol error rate.

By comparing this statistic to the Viterbi metrics above, it may appear that the re-encoded symbol error rate is no different than the Viterbi metrics if hard decisions were input to the Viterbi decoder. Since soft decisions contain more information than hard decisions, it is reasonable to assume that the Viterbi metrics with soft decision inputs are a better statistic with which to do rate decision and there is nothing to be gained by computing the re-encoded symbol error rate. In practice, however, making complete use of the Viterbi metrics requires an estimate of the signal to noise ratio which is difficult to obtain.

The main advantage of using the re-encoded error rate is that its behavior is simpler to model and more well understood. The disadvantage is that it requires additional complexity to compute the re-encoded error rate whereas the Viterbi metrics are already computed to complete the Viterbi decoding process.

The preferred statistic for the re-encoded error rate will now be described. Let sj be the normalized number of symbol errors for the $j^{th}$ rate. The normalized number of symbol errors is defined as the number of symbol errors out of ³⁸⁴⁄₅₇₆ symbols and is computed by multiplying the actual number of symbol errors by 8,4,2, and 1 for ⅛, ¼, ½, and full rate, respectively. The symbol error rate is calculated over all bits, including power control bits which are set to 0 (in full rate, the number of symbol errors is increased by approximately half of the number of power control bits. The performance can be improved by eliminating the power control bits from the full rate SER calculation, but adds significant complexity.). For rate set 2, full rate, the 2 of 6 puncturing is accounted for so that the SER is calculated over 384 symbols.

Given that the $i^{th}$ rate was transmitted, and assuming that the distribution of the number of symbol errors is approximately Gaussian, the probability density function of the set of symbol error values can be expressed as $$p(\overline{Y}_3 | r_i) = \prod_{j=0}^{3} \frac{1}{\sqrt{2\pi\sigma_{j,i}^2}} \exp\left[-\frac{(s_j - m_{j,i})^2}{2\sigma_{j,i}^2}\right]$$

where the subscripts 0,1,2, and 3 represent eighth, quarter, half, and full rates, respectively. The natural log of the probability density function can be represented as $$\ln p(\bar{Y}_3 \mid r_i) = -2\ln(2\pi) - \sum_{j=0}^{3}\ln(\sigma_{j,i}) - \sum_{j=0}^{3}\frac{(s_j - m_{j,i})^2}{2\sigma_{j,i}^2}$$

The first term is independent of the rate and the best choice of variances based on experimental values can be chosen such that the second term is a constant without significant loss in performance. Therefore, a sufficient statistic for rate decision based on the re-encoded symbol error rate is given by $$\ln p(\bar{Y}_3 \mid r_i) = -\sum_{j=0}^{3}\frac{(s_j - m_{j,i})^2}{2\sigma_{j,i}^2}$$

where the experimentally determined preferred values for the means and standard deviations for one system are provided in the following tables.

TABLE 1

Re-encoded SER mean values, rate set 1

| $m_{j,i}$ | eighth (i = 0) | Quarter (i = 1) | half (i = 2) | Full (i = 3) |
|---|---|---|---|---|
| Eighth (j = 0) | 52 | 96 | 96 | 96 |
| Quarter (j = 1) | 79 | 46 | 79 | 79 |
| half (j = 2) | 72 | 72 | 44 | 72 |
| full (j = 3) | 74 | 74 | 74 | 45 |

TABLE 2

Re-encoded SER standard deviation values, rate set 1

| $\sigma_{j,i}$ | eighth (i = 0) | Quarter (i = 1) | half (i = 2) | Full (i = 3) |
|---|---|---|---|---|
| Eighth (j = 0) | 15 | 15 | 15 | 15 |
| Quarter (j = 1) | 10 | 10 | 10 | 10 |
| half (j = 2) | 7 | 7 | 7 | 7 |
| full (j = 3) | 6 | 6 | 6 | 6 |

TABLE 3

Re-encoded SER mean values, rate set 2

| $m_{j,i}$ | Eighth (i = 0) | Quarter (i = 1) | half (i = 2) | Full (i = 3) |
|---|---|---|---|---|
| Eighth (j = 0) | 76 | 127 | 127 | 127 |
| Quarter (j = 1) | 110 | 66 | 110 | 110 |
| half (j = 2) | 100 | 100 | 64 | 100 |
| full (j = 3) | 37 | 37 | 37 | 18 |

TABLE 4

Re-encoded SER standard deviation values, rate set 2

| $m_{j,i}$ | Eighth (i = 0) | Quarter (i = 1) | half (i = 2) | Full (i = 3) |
|---|---|---|---|---|
| Eighth (j = 0) | 17 | 17 | 17 | 17 |
| Quarter (j = 1) | 13 | 13 | 13 | 13 |
| half (j = 2) | 10 | 10 | 10 | 10 |
| full (j = 3) | 6 | 6 | 6 | 6 |

It will be appreciated that other systems will yield different values for these means and standard deviations.

Distance to Next Largest Viterbi Metric

Another statistic used in the preferred embodiment is the distance from the Viterbi metric, described above, to the next largest sum in the Viterbi decoder. Generating a single bit metric by comparing this distance to a threshold is known as a Yamamoto quality metric. The N bit distance between the maximum path and the next largest sum contains more information than the traditional Yamamoto quality metric. This can be derived by storing the minimum distance between the two incoming paths at each state during the Viterbi decoding process. This distance for the strongest path is the distance between the $1^{st}$ and $2^{nd}$ best path through the Viterbi decoder.

The preferred statistic for the distance to the next largest Viterbi metric will now be described. Let dj be the normalized distance for the $j^{th}$ rate. The normalized distance is defined to account for the fact that different rates have different symbol magnitudes due to symbol combining, and this translates directly into a larger unnormalized distance for lower rates. The normalized distance is computed by multiplying the actual distance by 1,2,4, and 8 for ⅛, ¼, ½, and full rate, respectively. Given that the $i^{th}$ rate was transmitted, and assuming that the distribution of the distance is approximately Gaussian, the probability density function of the set of symbol error values can be expressed as $$p(\bar{Y}_4 \mid r_i) = \prod_{j=0}^{3}\frac{1}{\sqrt{2\pi\sigma_{j,i}^2}}\exp\left[-\frac{(d_j - m_{j,i})^2}{2\sigma_{j,i}^2}\right]$$

where the subscripts 0,1,2, and 3 represent eighth, quarter, half, and full rates, respectively. The natural log of the probability density function can be represented as $$\ln p(\bar{Y}_4 \mid r_i) = -2\ln(2\pi) - \sum_{j=0}^{3}\ln(\sigma_{j,i}) - \sum_{j=0}^{3}\frac{(d_j - m_{j,i})^2}{2\sigma_{j,i}^2}$$

The first term is independent of the rate and the best choice of variances based on experimental values can be chosen such that the second term is a constant without significant loss in performance. Therefore, a sufficient statistic for rate decision based on the distance to the next largest Viterbi metric is given by $$\ln p(\overline{Y}_4 \mid r_i) = -\sum_{j=0}^{3} \frac{(d_j - m_{j,i})^2}{2\sigma_{j,i}^2}$$

where the experimentally determined values for the means and standard deviations are provided in the following tables.

TABLE 5

Distance to Next Largest Viterbi Metric mean values, rate set 1

| $m_{j,i}$ | eighth (i = 0) | Quarter (i = 1) | half (i = 2) | full (i = 3) |
|---|---|---|---|---|
| eighth (j = 0) | 90 | 0 | 0 | 0 |
| quarter (j = 1) | 0 | 90 | 0 | 0 |
| half (j = 2) | 0 | 0 | 90 | 0 |
| full (j = 3) | 0 | 0 | 0 | 90 |

TABLE 6

Distance to Next Largest Viterbi Metric standard deviation values, rate set 1

| $\sigma_{j,i}$ | eighth (i = 0) | Quarter (i = 1) | half (i = 2) | full (i = 3) |
|---|---|---|---|---|
| eighth (j = 0) | 50 | 15 | 15 | 15 |
| quarter (j = 1) | 15 | 50 | 15 | 15 |
| half (j = 2) | 15 | 15 | 50 | 15 |
| full (j = 3) | 15 | 15 | 15 | 50 |

TABLE 7

Distance to Next Largest Viterbi Metric mean values, rate set 2

| $m_{j,i}$ | eighth (i = 0) | Quarter (i = 1) | half (i = 2) | full (i = 3) |
|---|---|---|---|---|
| eighth (j = 0) | 90 | 0 | 0 | 0 |
| quarter (j = 1) | 0 | 90 | 0 | 0 |
| Half (j = 2) | 0 | 0 | 90 | 0 |
| Full (j = 3) | 0 | 0 | 0 | 90 |

TABLE 8

Distance to Next Largest Viterbi Metric standard deviation values, rate set 2

| $m_{j,i}$ | eighth (i = 0) | Quarter (i = 1) | half (i = 2) | full (i = 3) |
|---|---|---|---|---|
| Eighth (j = 0) | 50 | 15 | 15 | 15 |
| Quarter (j = 1) | 15 | 50 | 15 | 15 |
| Half (j = 2) | 15 | 15 | 50 | 15 |
| Full (j = 3) | 15 | 15 | 15 | 50 |

It will be appreciated that other systems will yield different values for these means and standard deviations.

Other possible measures not used in the preferred embodiment

Although the preferred embodiment utilizes the above described measures, the present invention is not limited to these measures. This Section will discuss some other possible measures although it will be appreciated that this list is not exhaustive.

Received Power Level

The base station transmits each of the four possible rates at different power levels. If full rate is transmitted at a power level P, then half, quarter, and eighth rate are transmitted at a power level P/2, P/4, and P/8, respectively. If an accurate measurement of the received power level can be obtained, this can be used to assist in the rate decision algorithm.

The disadvantage of this approach is that the received power level is affected by more than just the transmit power and the transmit power P is also a time varying parameter when power control is employed. The best way to estimate the received power level seems to be to estimate the power level in the soft decisions, normalize by the receive front end automatic gain control (AGC), and compare it to an estimate of P. An estimate of P for each frame can be obtained by estimating the power level in the soft decisions, normalizing by the front end AGC, and then normalizing by the determined receive rate. An overall estimate of P can be obtained by filtering the estimate of P for each frame.

Rate of Previous Frame

The rate of the previous frame can be used for rate decision only if the rates for successive frames are correlated with each other. If the transmitted rate is independent from one frame to the next, then the rate of the previous frame can not improve the rate decision algorithm. The rate of each frame can be correlated for certain voice coding algorithms, although the probability rate transition matrix is different for different voice coding algorithms which would imply that rate decision would be dependent on the voice coding algorithm. The rate of each frame can be correlated when receiving high volumes of data.

Erasures—Block 52

This section describes the method of declaring erasures implemented by block 52 of FIG. 2. After the rate decision algorithm has chosen the rate, some method should preferably be employed to determine whether the frame is good or bad. Assuming a perfect rate decision, the CRC alone is not enough to meet the required specification. If the CRC does not pass, the frame is obviously declared an erasure. If the CRC passes, then further testing must be performed before declaring the frame as valid. It is difficult to extract this information from the Viterbi metrics. The only remaining statistics are the re-encoded SER and the distance metrics. A simple approach is to define decision regions for valid and invalid frames. A good model for the decision regions based on simulated data is depicted in FIG. 4, in which the shaded area represents invalid frames.

Reasonable values for each rate are given in the following table.

TABLE 9

Erasure Decision Thresholds

| Rate | $s_1$ | $s_2$ | $d_1$ | $d_2$ |
|---|---|---|---|---|
| full-RS1 | 73 | 73 | 0 | 0 |
| half-RS1 | 72 | 46 | 8 | 36 |
| quarter- | 72 | 44 | 10 | 28 |

TABLE 9-continued

Erasure Decision Thresholds

| Rate | $s_1$ | $s_2$ | $d_1$ | $d_2$ |
|---|---|---|---|---|
| RS1 | | | | |
| eighth-RS1 | 104 | 72 | 11 | 29 |
| full-RS2 | 50 | 36 | 0 | 8 |
| half-RS2 | 100 | 76 | 4 | 8 |
| quarter-RS2 | 112 | 80 | 2 | 16 |
| eighth-RS2 | 152 | 104 | 3 | 8 |

Conclusion

Numerous variations and modifications will become apparent to those skilled in the art once the above disclosure is highly appreciated. It is intended that the following claims be interpreted to embrace all such variations and modifications.

What is claimed is:

1. A method for receiving and decoding a signal that includes data that has been encoded at a particular rate which is one of a plurality of possible rates:
   for each of a plurality of possible rates, computing a plurality of test statistics based on the signal wherein each of the test statistics is a function of the probability that the data was encoded at a corresponding one of the plurality of possible rates;
   for each of the plurality of possible rates, generating a final test statistic that is a function of the plurality of test statistics computed for a corresponding one of the plurality of possible rates;
   comparing the values of at least two of the final test statistics against one another;
   selecting one of the plurality of possible rates based on the result of the step of comparing the values of at least two of the final test statistics.

2. The method of claim 1 wherein the plurality of test statistics comprise statistics pertaining to a cyclical redundancy check, a Viterbi metric, symbol error rate and distance to a next largest Viterbi metric.

3. The method of claim 1 wherein the selecting one of the plurality of possible rates comprises the step of selecting the rate with the largest corresponding test statistic.

4. The method of claim 1 wherein at least one of the plurality of test statistics is a function of the logarithm of the probability that the data was encoded at a corresponding one of the plurality of possible rates.

5. The method of claim 4 wherein the final test statistic comprises a sum of the plurality of test statistics.

6. The method of claim 5 wherein the final test statistic is equal to $$\ln p(\overline{Y}|r_i) = \ln p(\overline{Y}_1|r_1) + p(\overline{Y}_2|r_2) + \ln p(\overline{Y}_3|r_3) + p(\overline{Y}_4|r_4);$$

where $$\ln p(\overline{Y}_1 | r_i) = \ln p(c_i | r_i) = \begin{cases} 0 & c_i = 1 \\ \ln F & c_i = 0 \end{cases} ; \text{ and}$$

$$\ln p(c_i | r_j, i \neq j) = \begin{cases} -l_i \ln 2 & c_i = 1 \\ 0 & c_i = 0 \end{cases}$$

$$\ln p(\overline{Y}_2 | r_i) = \frac{\text{sgn}[v(i) - y(i)] * [v(i) - y(i)]^2}{2\sigma_v^2};$$

$$\ln p(\overline{Y}_3 | r_i) = -2\ln(2\pi) - \sum_{j=0}^{3} \ln(\sigma_{j,i}) - \sum_{j=0}^{3} \frac{(s_j - m_{j,i})^2}{2\sigma_{j,i}^2}; \text{ and}$$

$$\ln p(\overline{Y}_4 | r_i) = -\sum_{j=0}^{3} \frac{(d_j - m'_{i,j})^2}{2\sigma'^2_{j,i}}$$

where $c_i$ is a flag which is equal to 1 if the CRC passes for the $i^{th}$ rate and equal to 0 if the CRC fails for the $i^{th}$ rate;
   $l_i$ represents the number of bits used for the CRC for the $i^{th}$ rate;
   subscripts 0,1,2, and 3 represent eighth, quarter, half, and fill rates, respectively;
   $v(x)$ represent the viterbi metrics for 1/8, 1/4, 1/2, and fall rate for x=0,1,2, and 3, respectively;
   $y(x)$ is the best fit line through the data points defined by $v(x)$;
   $\sigma$, is an experimentally determined variance factor;
   sj is the normalized number of symbol errors for the $j^{th}$ rate;
   $m_{ij}$ and $\sigma_{ij}$ are experimentally determined mean and variance factors;
   $m'_{ij}$ and $\sigma'_{ij}$ are experimentally determined mean and variance factors; and
   dj is the normalized distance between the viterbi metric with the greatest value and the next largest viterbi metric, for the $j^{th}$ rate.

* * * * *